United States Patent [19]

Hutzelman et al.

[11] 3,955,199

[45] May 4, 1976

[54] METHOD OF AND APPARATUS FOR GROUND TESTING DOPPLER NAVIGATION SETS-A DOPPLER RADAR SIMULATOR

[75] Inventors: Robert W. Hutzelman, Sylmar; Everitt E. Fairbanks, Arleta, both of Calif.

[73] Assignee: The United States of America as represented by the Secretary of the Navy, Washington, D.C.

[22] Filed: Aug. 21, 1974

[21] Appl. No.: 499,249

[52] U.S. Cl. ........................... 343/17.7; 343/100 ET
[51] Int. Cl.² ........................................... G01S 7/40
[58] Field of Search ................... 343/17.7, 100 ET

[56] References Cited
UNITED STATES PATENTS

| | | | |
|---|---|---|---|
| 2,159,937 | 5/1939 | Zworykin | 343/100 ET |
| 2,886,811 | 5/1959 | Harrison, Jr. | 343/100 ET |
| 3,024,460 | 3/1962 | Dahl et al. | 343/17.7 |
| 3,090,955 | 5/1963 | Hubka et al. | 343/17.7 |
| 3,225,295 | 12/1965 | Altman et al. | 343/17.7 X |
| 3,622,680 | 11/1971 | Palmieri | 343/17.7 X |

FOREIGN PATENTS OR APPLICATIONS

| | | | |
|---|---|---|---|
| 577,458 | 5/1946 | United Kingdom | 343/100 ET |

*Primary Examiner*—Malcolm F. Hubler
*Attorney, Agent, or Firm*—R. Sciascia; R. Beers; S. Scheinbein

[57] ABSTRACT

A doppler/range simulator for use in testing aircraft systems based on the principle that an ionized gas absorbs microwave radiation and thus becomes raised to higher energy levels, and when falling back to the original energy state the ionized gas re-radiates the absorbed microwave energy. A frequency control simulates a doppler or velocity signal. A voltage or current control simulates the time delay or altitude range signal.

The test set is in the form of a light-weight anechoic chamber lined on the inside with energy absorbant material except for the top. Within the enclosure there are positioned near the open top a plurality of parallel - arranged flurescent tubes adapted to be energized with pulsating d.c. to produce a flow of ions in the tubes which flow from one end of the tube to the other. The tubes are excited in parallel so that the ion flow is always in the same direction. The enclosure is provided with means for easily attaching and detaching the chamber to the underside structure of the aircraft at a location immediately beneath and close to the transmitting and receiving antennas of the radome.

11 Claims, 2 Drawing Figures

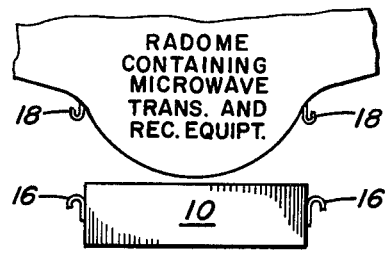
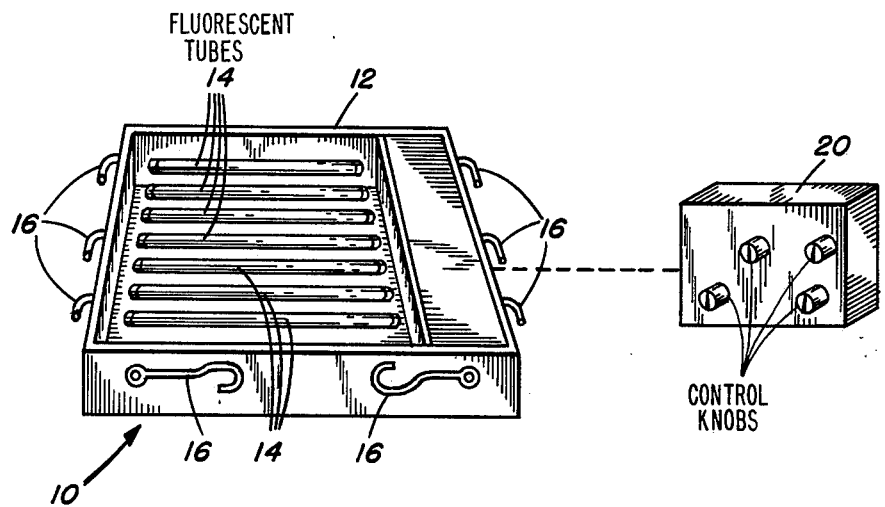

METHOD OF AND APPARATUS FOR GROUND TESTING DOPPLER NAVIGATION SETS-A DOPPLER RADAR SIMULATOR

BACKGROUND OF INVENTION

This invention is an improved doppler microwave radar simulator which simulates a moving earth, without moving components, so as to minimize weight, complexity and size.

Aircraft microwave doppler/range radar systems for testing aircraft without the need to fly the aircraft have been suggested in the past. Such known test systems have employed such methods as coupling the output to the input by means of feed horns and suitable waveguides, R.F. feed horns intercepting antenna beams, utilizing a rotating drum or disk to impart a doppler shift or delay to the signal transmitted, also using a common household window fan suitably located with respect to the system antenna. Such known test systems are large and/or the results obtained are not accurately repeatable to insure a measure of confidence in the test system. Moreover the environment on an aircraft flight line is generally considered to include the possibility of an explosive atmosphere because of the presence of aviation fuel. Examples of known doppler target simulators and doppler antenna calibration apparatus are disclosed in U.S. Pat. Nos. 3329953; 3787866; 3142059; 3665616 and 3108275.

The present invention provides an electronic microwave doppler/range/test simulator and a method of operating the same which overcome the foregoing disadvantages and is suitable as a flight-line device of reduced weight, complexity and size.

SUMMARY OF INVENTION

The invention has no moving parts and makes use of an ionized gas as an RF-modifying reflector in test devices for microwave equipment. The simulator of the invention utilizes the inherent delay between the entry of and escape from an ionized gas of microwave radiation. An RF anechoic chamber removes unshifted or undelayed radiation.

The transmitted energy from the antenna is modified and the modified energy is returned to the microwave doppler and altimeter system. By varying the area of ionized gas available or visible to the antenna of the system under test, a threshold may be determined as an indication of system merit. Velocity derived may be varied as a function of the gas tube excitation frequency and the amount of delay as a function of gas tube current. A frequency control unit is used to simulate doppler shift in the carrier frequencies and precise applied voltage and frequency levels are employed to give calibrated values of velocity and altitude. A doppler receiver demodulates the received microwave signal to provide an accurate indication of the performance of the overall doppler/range system.

Among the objects of the invention are: to utilize a moving ionized field for simulating a moving target in a test instrument; to enable a gaseous medium to absorb a portion of the radiated output energy of an active microwave system and re-radiate the energy back to its input for verifying the proper operation of the system; to provide an improved electronic microwave doppler/range test simulator of reduced weight, complexity and size suitable for use with aircraft without the need to fly the aircraft; and to provide an improved electronic source of simulated radar signals whose output signal characteristics can be varied to duplicate the received signal in a doppler type of radar system from which the speed and/or altitude can be computed.

BRIEF DESCRIPTION OF INVENTION

A detailed description of the invention follows in conjunction with the drawing, wherein:

FIG. 1 illustrates generally the test set location of the Doppler target simulator of the present invention in relation to the radome at the bottom of an aircraft, for both receiving radiation from the transmitting antennas within the radome and re-radiating the radiation back to the receiving antennas within the randome, and FIG. 2 diagrammatically illustrates the doppler simulator of the invention with ion plasma producing means contained within an anechoic chamber.

DETAILED DESCRIPTION

The specific embodiment of the doppler simulator of the invention shown in the drawing is a test set 10 in the form of a rectangular box-like anechoic chamber 12 having four closed side walls and a bottom wall and containing therein facing its open top a plurality of parallel-arranged straight fluorescent tubes 14. Anechoic chamber 12 may be made of sheet aluminum and is lined, except for the open top adjacent the fluorescent tubes, with a microwave energy absorbant material such as graphite-loaded sponge material sometimes referred to as echosorb.

The anechoic chamber 10 is fitted on the exterior of its side walls with bent metal rods in the form of swiveling hooks 16 which are adapted to hook on to suitably positioned hooks 18 at the bottom of the aircraft structure at positions on the sides of and around the bump of the radome. The aircraft radome is well-known in the art and may consist of slot antennas for both the receiver and the transmitting equipment. These antennas face the open top of the anechoic chamber and the fluorescent tubes contained therein. The chamber is relatively shallow and as light in weight as possible. The fluorescent tubes are chosen to be relatively long with respect to the apertures of the slot antennas.

The chamber 10 with its fluorescent tubes simulates the moving earth or ground surfaces when the tubes are energized from a variable frequency-variable voltage power supply control box 20. Control box 20 is provided with dials to control the excitation frequency and voltage supplied to the fluorescent tubes in any manner well known to those skilled in the art. The velocity derived varies as a function of the gas tube excitation frequency and the amount of delay varies as a function of the tube current.

The fluorescent tubes 14 are excited by a pulsating unfiltered d.c. (direct current). One end of the tubes is always positive relative to the other end of the tube.

The microwave transmitting and receiving equipment within the radome is not shown because they are well known in the art. They are usually installed in a vibration-isolated mount on the antenna. A portion of the transmitted signal is used to generate a coherent receiver local oscillator signal. This oscillator is coherent when transmitter stability is achieved. The received energy is mixed with this local oscillator signal to derive the doppler frequency. The transmitting antennas are stabilized in roll and pitch and may produce a radiation pattern consisting of several orthogonal beams or lobes each 20° from the vertical with an absence of radiation in the center with suitable microwave beam switching equipment, as well known in the art. Direct feedback or leakage between the separate transmitting and receiving antenna arrays within the radome is avoided.

The operation of the doppler target simulator will now be given. The pulsating unfiltered d.c. which energizes the fluorescent tubes causes a moving ionized field to occur which simulates a moving target, such as the earth's surface. There is a flow of ions in the tubes which travel from one end of the tube to the other. The ionized gas in the tubes absorb the output microwave radiation from the transmitting array of slot antennas in the radome and thus become raised to higher energy levels and then re-radiate the absorbed microwave energy back to the receiving antenna array of slot antennas in the radome when falling back to the original energy state during the intervals between the applied d.c. pulses. The data obtained from the re-radiated beams are resolved into earth surface distances (velocities) and vertical distance (altitude).

In one embodiment of the invention satisfactorily tested, a plurality of 20 watt fluorescent tubes each 24 inches in length were used and energized at the audio frequency rate of 400 pps (pulses per second). The tubes were operated in pairs, any combination of which could be used. The tubes were excited in phase such that when one end of the tubes was positive all the other ends were negative. One end of the tubes could, if desired, be grounded. It is desirable that the tubes do not provide an unnecessarily dense plasma so that a higher altitude readout can be obtained and it is desirable to provide a ballast that will resonate at high frequencies to give higher velocity. The control box 20 was provided with a frequency control dial operable by hand to obtain a linear relationship between the excitation or power frequency for the fluorescent tubes and the doppler shift. The power supply used was a Behlmann unit which could be varied from 50 cps to 1000 cps, 3 phase, 115 volts. The frequency radiated from the radome transmitting array was 13 giga Hz (13,000 megacycles-with a wavelength of approximately 2 Cm). The dimensions of the test set enclosure was approximately 25 in. L × 25 in. W × 16 in. D.

There has been disclosed a novel technique of utilizing the delay inherent in an ionized gas layer to re-radiate RF in order to simulate range. The invention not only utilizes (a) relatively long term migration of ions to simulate relative motion of the earth (doppler shift proportional to velocity) but also (b) delay within a cloud of ions, between incident radiation and resultant re-radiation, to simulate a longer propagation path (range or altitude).

What is claimed is:

1. A method for testing a doppler velocity/altimeter radar with an antenna situated in an aircraft comprising the steps of:
    attaching to the aircraft an anechoic chamber to absorb microwave energy, said chamber having closed sides and bottom and an open top with a plurality of parallel arranged flourescent tubes set within the chamber facing the open top so that the open top of the chamber faces the antenna;
    pulsing said flourescent tubes in paralel with a direct current so that groups of ions travel in one direction through said plurality of tubes at a speed determined by the frequency of said pulsing;
    transmitting microwave energy from the antenna, which energy is absorbed by the traveling groups of ions, raising said ions to a higher energy level; and
    re-radiating the energy absorbed by the ions to the antenna as the ions return to their normal energy state after a delay determined by the amplitude of said direct current.

2. A doppler/range simulator for testing an aircraft doppler velocity/altimeter radar having an antenna comprising:
    means for absorbing microwave energy;
    a source of ionizable gas mounted within said absorbing means;
    means for exciting said source of gas to create a traveling ionized field to simulate a moving target whereby energy transmitted by said antenna is absorbed by said gas and re-radiated to said antenna to provide an indication of the velocity and distance from the simulated target.

3. A doppler/range simulator as recited in claim 2 wherein said absorbing means comprises an anechoic chamber.

4. A doppler/range simulator as recited in claim 3 wherein said source of ionizable gas comprises a plurality of flourescent tubes arranged in a planar parallel array mounted within said anechoic chamber.

5. A doppler/range simulator as recited in claim 4 wherein said exciting means comprises a pulsating D.C. power supply to provide precise voltage levels and frequency levels, wherein the voltage determines the time delay between absorption and re-radiation by said ionized field to simulate target distance, and wherein the frequency of the pulses determines the speed of said field to simulate target motion.

6. A doppler/range simulator as recited in claim 5 wherein said power supply is connected to said tubes so that one end of said tubes is always positive relative to the opposite end of said tubes, and said power supply excites any pair of said tubes in phase one with the other.

7. A doppler/range simulator as recited in claim 6 wherein said simulator further comprises means for placing said simulator in proximity to said antenna so that said antenna can transmit microwave energy to, and receive microwave energy from, said flourescent tubes situated within said anechoic chamber.

8. A doppler/range simulator as recited in claim 7 wherein said anechoic chamber comprises:
    an enclosure open at the top; and
    a lining of microwave energy absorbent material along all sides and bottom of said enclosure.

9. A doppler/range simulator as recited in claim 8 wherein said plurality of flourescent tubes are relatively long with respect to said antenna.

10. A doppler/range simulator as recited in claim 9 wherein said placing means comprises:
    a radome having a bump, said radome being mounted on said aircraft and enclosing said antenna;
    a plurality of fixed hooks positioned on the sides of and around said bump; and
    a plurality of swivelling hooks fitted to the exterior of said anechoic chamber suitably positioned to engage said fixed hooks on said radome whereby said simulator is securely held in proximity to said antenna so that the opening of said enclosure faces said antenna.

11. A doppler/range simulator as recited in claim 10 wherein said enclosure comprises sheet aluminum, and said lining comprises graphite-loaded sponge material.

* * * * *